United States Patent [19]
Muramatsu et al.

[11] Patent Number: 6,138,803
[45] Date of Patent: Oct. 31, 2000

[54] SPRAG TYPE ONE-WAY CLUTCH

[75] Inventors: Kazuhiko Muramatsu; Hirofumi Shirataki, both of Fukuroi, Japan

[73] Assignee: NSK-Warner K.K., Tokyo, Japan

[21] Appl. No.: 09/138,523

[22] Filed: Aug. 24, 1998

[30] Foreign Application Priority Data

Aug. 26, 1997 [JP] Japan .................................. 9-229234

[51] Int. Cl.$^7$ .................................................. F16D 11/06
[52] U.S. Cl. ...................... 192/41 A; 192/41 R; 192/45.1
[58] Field of Search ............................... 192/41 A, 45.1, 192/53.1, 415

[56] References Cited

U.S. PATENT DOCUMENTS 5,038,903  8/1991  Akagi et al. ................................ 192/41
5,601,167  2/1997  Kinoshita et al. ...................... 192/45.1

FOREIGN PATENT DOCUMENTS 1-188726  7/1989  Japan .

*Primary Examiner*—Rodney H. Bonck
*Assistant Examiner*—Tisha D. Waddell
*Attorney, Agent, or Firm*—Vorys, Sater, Seymour and Pease LLP

[57] ABSTRACT

In a one-way clutch comprising an outer race having an inner peripheral raceway surface and an inner race disposed in the outer race and having an annular outer peripheral raceway surface, the outer race and the inner race being radially spaced apart from each other and disposed concentrically with each other for rotation relative to each other, a plurality of sprags disposed between the outer race and the inner race for transmitting torque between the outer peripheral raceway surface and the inner peripheral raceway surface, an annular holder for holding the sprags, a spring member for holding the sprags with the holder and biasing the sprags in a meshing direction, and an annular retainer fixed to one of the inner race and the outer race to axially hold the holder, the retainer has a protruding portion protruding axially inwardly, and the protruding portion bears against the axial end portion of the holder.

6 Claims, 4 Drawing Sheets

SPRAG TYPE ONE-WAY CLUTCH

BACKGROUND OF THE INVENTION

1. Field of the Invention

This invention relates to a one-way clutch (cam clutch) for use as a part for torque transmission, back stop or the like, for example, in the driving apparatus of an automobile (particularly an automatic transmission for an automobile), a two-wheeled vehicle, an industrial machine or the like, and more particularly to an improvement in a construction for giving a drag torque to between a holder and an outer race.

2. Related Background Art

Generally, a sprag type one-way clutch 100 (the double cage type) provided with a sprag functioning as a cam, as shown in FIG. 10 of the accompanying drawings, comprises an outer race 110, an inner race 120 disposed for rotation relative to the outer race 110, an annular inner holder 135 and an outer holder 136 disposed between the outer race 110 and the inner race 120, a plurality of sprags 130 equidistantly held by the inner and outer holders 135 and 136, a ribbon spring member 138 for biasing the sprags 130 in a meshing direction, and end bearings 132 disposed at the axially opposite ends to maintain the concentricity of the outer race 110 and the inner race 120.

The end bearings 132 of the one-way clutch 100 are axially held by an annular snap ring 131 and an annular retainer 134 fixed to the outer race to prevent them from axially coming off. The sprags are given a rising moment in a direction to mesh with the raceway surfaces of the inner and outer races by the ribbon spring member 138.

Generally, in the one-way clutch, when there is sudden acceleration or deceleration in the rotation of the outer race, the sprags slide on the raceway surfaces of the outer race due to inertia and the timing of meshing is delayed and therefore, a frictional force (drag torque) is sometimes given to between the outer holder and the outer race to thereby rotate them always as a unit. This is for quickly transmitting the movement of the outer race to the outer holder and securing the movement of the sprags. Therefore, a cut-away is formed in the circumferential surface of the outer holder, that is, T-bar working or i-bar working is effected, and this is deformed and forced into the outer race, or instead of the cut-away, a drag clip or the like is mounted on the outer holder to thereby obtain a predetermined frictional force. See, for example, Japanese Laid-Open Patent Application No. 1-188726.

For example, in FIG. 10, an i-bar 137 is formed on a portion of the outer holder 136 in the circumferential direction thereof to frictionally slide on the inner raceway surface of the outer race 110 and give a frictional force. Since predetermined drag torque is provided by this i-bar 137, the outer race 110 and the outer holder 136 always rotate as a unit.

Also, in a one-way clutch (the single cage type) wherein only one holder is provided between the inner and outer races, a cut-away was formed in a side plate as a member for giving a frictional force to between it and one of the inner and outer races. See, for example, U.S. Pat. No. 5,038,903.

However, the cut-away formed in the circumferential direction of the outer holder has led to a problem in the strength of the holder and a problem in terms of working. Also, in a one-way clutch (the single cage type) in which only one holder is provided between the inner and outer races, it has been difficult to give a drag as in the prior art when a side plate is not used.

SUMMARY OF THE INVENTION

Accordingly, it is an object of the present invention to provide a one-way clutch which can obtain a predetermined frictional force (drag torque) between one of inner and outer races and a holder without increasing the number of parts. Particularly, it is an object of the present invention to provide a one-way clutch of the single cage type in which it is easy to obtain a predetermined frictional force between one of inner and outer races and a holder.

In order to achieve the above objects, the sprag type one-way clutch of the present invention is a one-way clutch comprising an outer race having an inner peripheral raceway surface and an inner race disposed in the outer race and having an annular outer peripheral raceway surface, the outer race and the inner race being radially spaced apart from each other and disposed concentrically with each other for rotation relative to each other, a plurality of sprags disposed between the outer race and the inner race for transmitting torque between the outer peripheral raceway surface and the inner peripheral raceway surface, an annular holder for holding the sprags, a spring member for holding the sprags with the holder and biasing the sprags in a meshing direction, and an annular retainer fixed to one of the inner race and the outer race for axially holding the holder, characterized in that the retainer has a protruding portion protruding axially inwardly, and the protruding portion bears against the axial end portion of the holder.

According to the present invention, a frictional force can be obtained between the outer race or the inner race and the holder through the retainer of the one-way clutch and therefore, the holder need not be subjected to special working, and the number of parts is not increased.

BRIEF DESCRIPTION OF THE DRAWINGS

FIG. 2 is an axial cross-sectional view of the one-way clutch of FIG. 1 in which FIG. 2 is seen in the direction of arrow A.

FIG. 3 is a front view of the one-way clutch in which FIG. 2 is seen in the direction of arrow B.

DESCRIPTION OF THE PREFERRED EMBODIMENTS

Figure 1:
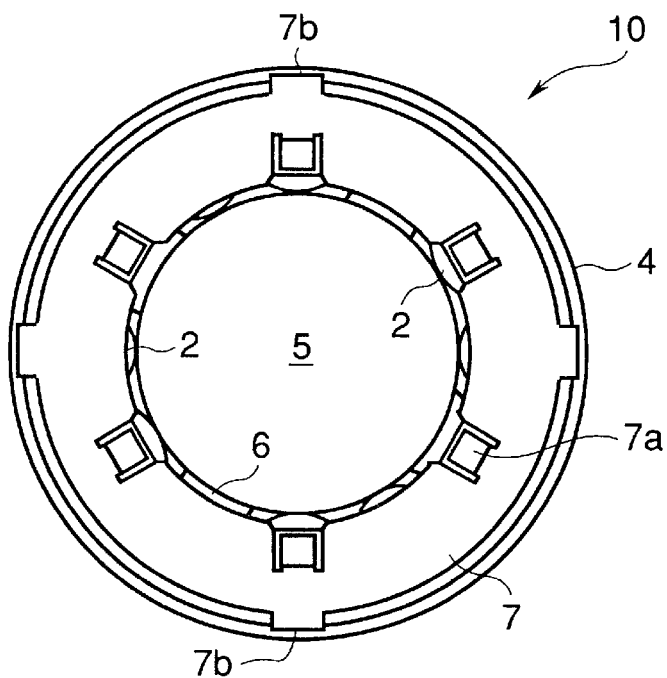
FIG. 1 is an axial front view of a sprag type one-way clutch of the single cage type according to a first embodiment of the present invention.

The invention will hereinafter be described in detail with reference to the drawings. The embodiments which will hereinafter be described are illustrative of the present invention, and of course do not restrict the present invention. In the drawings, like portions are designated by like reference numerals.

Figure 2:
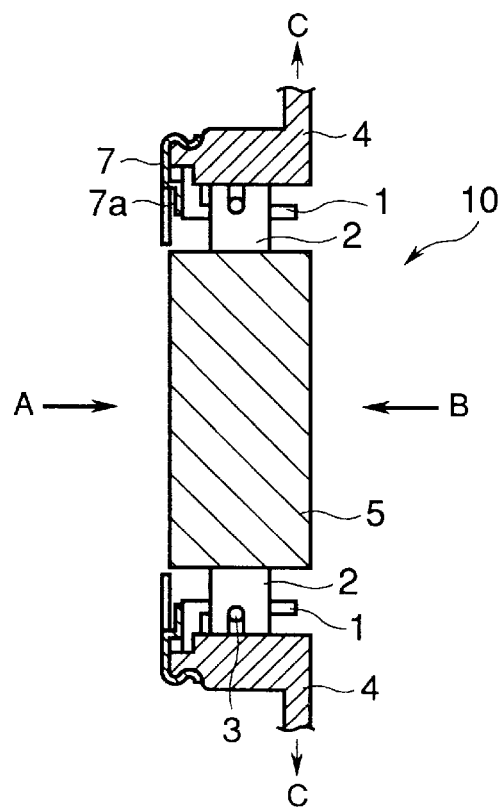
Figure 3:
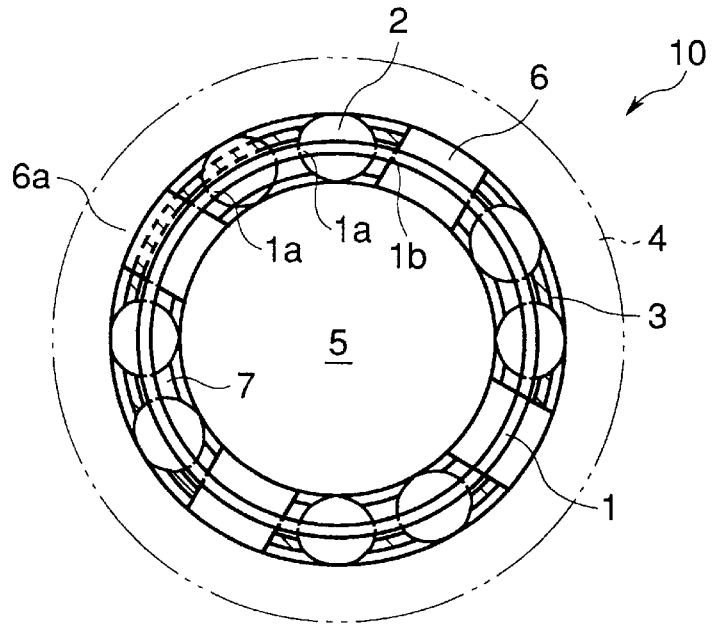
Figure 4:
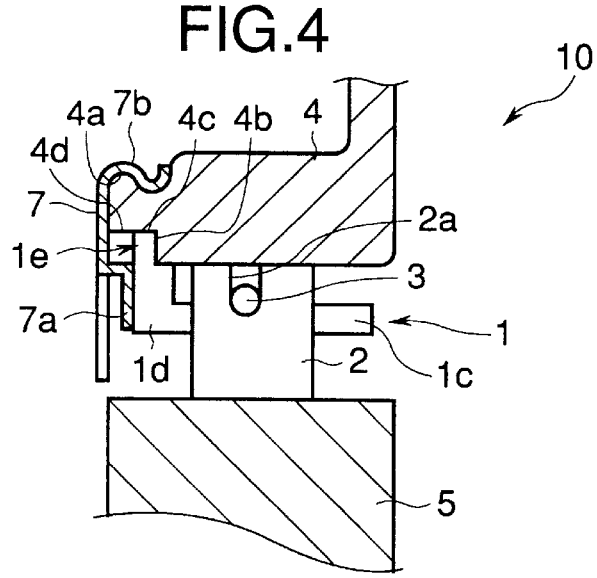
FIG. 4 is a view partly in axial cross-section showing the details of the one-way clutch of FIG. 2.

FIGS. 1 to 4 show a sprag type one-way clutch 10 of the single cage type according to a first embodiment of the present invention. FIG. 1 is an axial front view of the sprag type one-way clutch of the single cage type according to the first embodiment of the present invention. FIG. 2 is an axial cross-sectional view of the one-way clutch of FIG. 1. FIG. 1 is a front view in which FIG. 2 is seen in the direction of arrow A. FIG. 3 is a front view of the one-way clutch in which FIG. 2 is seen in the direction of arrow B. FIG. 4 is a view partly in axial cross-section showing the details of the one-way clutch of FIG. 2.

The sprag type one-way clutch 10 is provided with an outer race 4 connected to the friction engagement device (not shown) or the like of an automatic transmission in the direction of arrows C indicated in FIG. 2, and an inner race 5 disposed inside and concentrically with the outer race 4, and comprises a plurality of sprags 2 disposed between the outer peripheral raceway surface of the inner race 5 and the inner peripheral raceway surface of the outer race 4, an annular holder 1 for circumferentially equidistantly holding the sprags 2, and a garter spring 3 for holding the sprags 2 between itself and the inner race 5. The garter spring 3 holds the sprags and makes the movements of the sprags unitary. Also, it gives a predetermined frictional force necessary for meshing engagement between the sprags 2 and the inner peripheral raceway surface of the outer race 4 and between the sprags 2 and the outer peripheral raceway surface of the inner race 5.

The holder 1 is given a predetermined drag frictional force by the protruding portion 7a of a retainer 7 fixed to the outer race 4. The details of the retainer 7 will be described later with reference to FIG. 4.

FIG. 3 is a front view in which the one-way clutch 10 of FIG. 2 is seen in the direction of arrow B, and shows the arranged state of the sprags 2, the garter spring 3 and block bearings 6. The block bearings 6 perform the function of bearings keeping the outer race 4 and the inner race 5 concentric with each other while frictionally sliding on the outer peripheral raceway surface of the inner race 5. As can be seen from FIG. 3, a plurality of windows 1a and 1b radially extending through the holder 1 are provided in the holder 1 circumferentially at predetermined intervals.

The sprags 2 are pivotally fitted in the windows 1a, and the block bearings 6 are fitted in the windows 1b. In the present embodiment, the holder 1 holds eight sprags 2 in total in the circumferential direction thereof, and a block bearing 6 is held between pairs of sprags 2, and thus, four block bearings are held. The numbers of the sprags 2 and the block bearings 6 can of course be arbitrarily selected.

The garter spring 3 is fitted in circumferentially extending grooves 2a (see particularly FIG. 4) formed with a predetermined depth from the outer peripheral surfaces of the sprags 2 and grooves 6a formed in the block bearings 6 similarly to the grooves 2a of the sprags 2.

The details of the one-way clutch 10 according to the first embodiment of the present invention will now be described with reference to FIG. 4. The holder 1 is provided with a cylinder portion 1c and an annular flange portion 1d radially outwardly extending from an axial end of the cylinder portion 1c. The aforementioned radially extending windows 1a are provided at circumferentially equidistant locations in the cylinder portion 1c, and the sprags 2 are fitted in these windows 1a.

An annular stepped portion 1e is provided on the outer peripheral edge portion of the annular flange portion 1d over the full circumference thereof. On the other hand, on the axial end portion of the outer race 4 which is adjacent to the retainer 7, there is provided an annular stepped portion 4d formed from the axially outer edge and defined by two annular wall surfaces 4b and 4c.

As is apparent from FIG. 4, the stepped portion 1e of the holder 1 abuts with the wall surface 4b of the stepped portion 4d of the outer race 4, whereby it has its axially rightward movement limited in FIG. 4. Also, it abuts with the wall surface 4c of the stepped portion 4d, whereby it has its radially outward movement limited.

The annular retainer 7 is provided with a predetermined number of flange portions 7b provided circumferentially equidistantly on the radially outward edge portion thereof and having a waveform cross-section extending in the axial direction thereof. The flange portions 7b are fixed to the radially outward edge portion 4a having a waveform cross-section of a shape complementary to the flange portions 7b as by caulking. As the result, the retainer 7 is held in a state fixed to the outer race 4.

The retainer 7 is provided with protruding portions 7a protruding toward the flange portion 1d of the holder 1 at a location opposed to the flange portion 1d. The protruding portions 7a protrude and extend from the body of the retainer 7 by a predetermined distance so as to contact with the flange portion 1d. The protruding portions 7a frictionally contact with the flange portion 1d of the holder 1 to thereby give predetermined drag torque to between the holder 1 and the outer race 4, thus normally rotating the holder 1 and the outer race 4 as a unit.

As shown in FIG. 1, six protruding portions 7a are provided circumferentially equidistantly of the retainer 7, but of course, the number of the protruding portions can be arbitrarily selected.

FIGS. 5A and 5B through 8A and 8B show some examples of the protruding portion of the retainer 7 which can be used in the one-way clutch 10 according to the first embodiment.

Figure 5A:
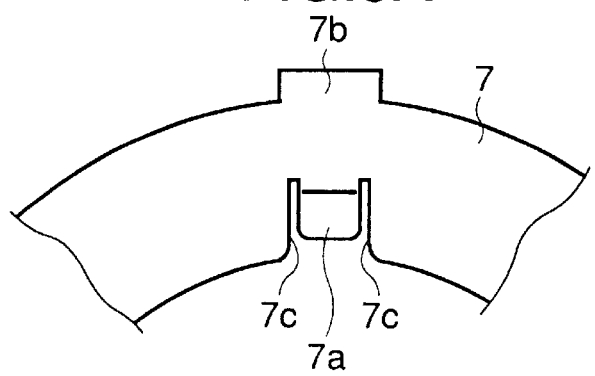
FIGS. 5A and 5B show a first example of a retainer used in first and second embodiments of the present invention, FIG. 5A being a fragmentary front view, and FIG. 5B being a cross-sectional view of the retainer of FIG. 5A.
Figure 5B:
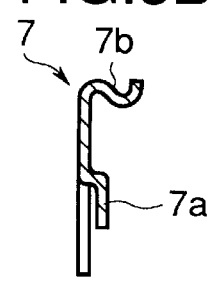

FIGS. 5A and 5B are a partly broken-away front view and a cross-sectional view, respectively, of the retainer 7. Cuts-in 7c extending from the radially inner side to substantially the intermediate portion are provided in a circumferential portion of the annular retainer 7, and a plate-like portion defined by the cuts-in 7c provides the protruding portion 7a bent and protruding axially inwardly. The protruding portion 7a bears against the flange portion 1d of the holder 1. An example using the thus formed protruding portion 7a is shown in FIGS. 1 to 4 and 9 (which will be described later).

FIGS. 6A and 6B through 8A and 8B show some modifications of the above-described protruding portion 7a applicable to the first embodiment.

Figure 6A:
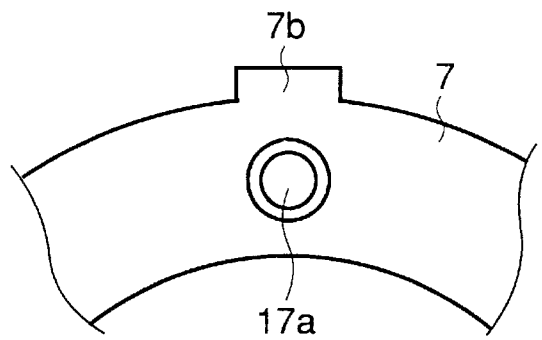
FIGS. 6A and 6B show a second example of the retainer used in the first and second embodiments of the present invention, FIG. 6A being a fragmentary front view, and FIG. 6B being a cross-sectional view of the retainer of FIG. 6A.
Figure 6B:
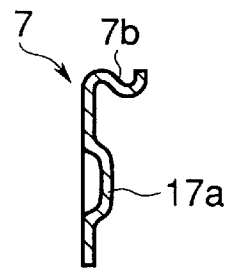

FIGS. 6A and 6B are a partly broken-away front view and a cross-sectional view, respectively, of the retainer 7. A substantially circular protruding portion 17a is provided on a circumferential portion of the annular retainer 7 which is the substantially radially intermediate portion, as by press working. The protruding portion 17a protrudes axially inwardly, and bears against the flange portion 1d of the holder 1.

Figure 7A:
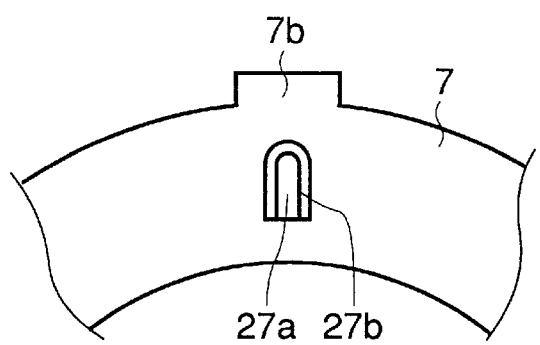
FIGS. 7A and 7B show a third example of the retainer used in the first and second embodiments of the present invention, FIG. 7A being a fragmentary front view, and FIG. 7B being a cross-sectional view of the retainer of FIG. 7A.
Figure 7B:
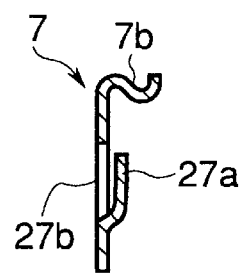

FIGS. 7A and 7B are a partly broken-away front view and a cross-sectional view, respectively, of the retainer 7. A slit 27b is provided in a circumferential portion of the annular retainer 7 which is the substantially radially intermediate portion, as by punching, and a plate-like portion integral with the radially inner edge portion is protruded axially inwardly by bending to thereby provide a protruding portion 27a. The protruding portion 27a has a free end radially outwardly, conversely to the protruding portion 7a shown in FIGS. 5A and 5B. The protruding portion 27a protrudes axially inwardly, and bears against the flange portion 1d of the holder 1.

Figure 8A:
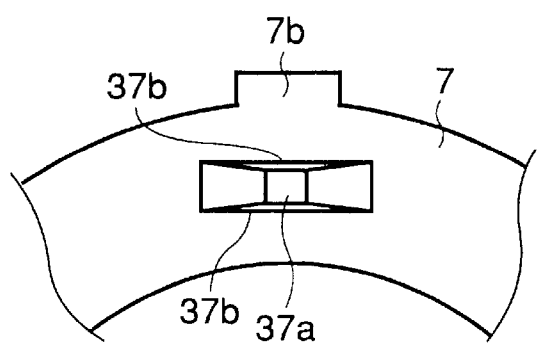
FIGS. 8A and 8B show a fourth example of the retainer used in the first and second embodiments of the present invention, FIG. 8A being a fragmentary front view, and FIG. 8B being a cross-sectional view of the retainer of FIG. 8A.
Figure 8B:
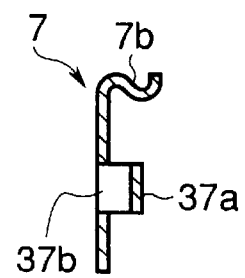

FIGS. 8A and 8B are a partly broken-away front view and a cross-sectional view, respectively, of the retainer 7. Two slits 37b which are parallel straight lines are provided in a circumferential portion of the annular retainer 7 which is the substantially radially intermediate portion, as by punching, whereafter the slits are axially inwardly protruded as by press working to thereby provide a protruding portion 37a. The protruding portion 37a protrudes axially inwardly and bears against the flange portion 1d of the holder 1.

Six protruding portions 17a, 27a and 37a shown in FIGS. 6A and 6B through 8A and 8B, like the protruding portions 7a, are provided circumferentially equidistantly of the retainer 7, but the numbers of these protruding portions can of course be arbitrarily selected.

As shown in FIGS. 1 and 5A and 5B through 8A and 8B, the protruding portions 7a, 17a, 27a and 37a are provided at the circumferentially same locations as the flange portions 7b for mounting the retainer 7 on the outer race so that a frictional force as necessary drag torque can be given to between the outer race and the holder, with consideration give to the rigidity of the retainer. However, the positional relation between and the shape of the protruding portions and the flange portions 7b are not restricted to those shown and described above.

Figure 9:
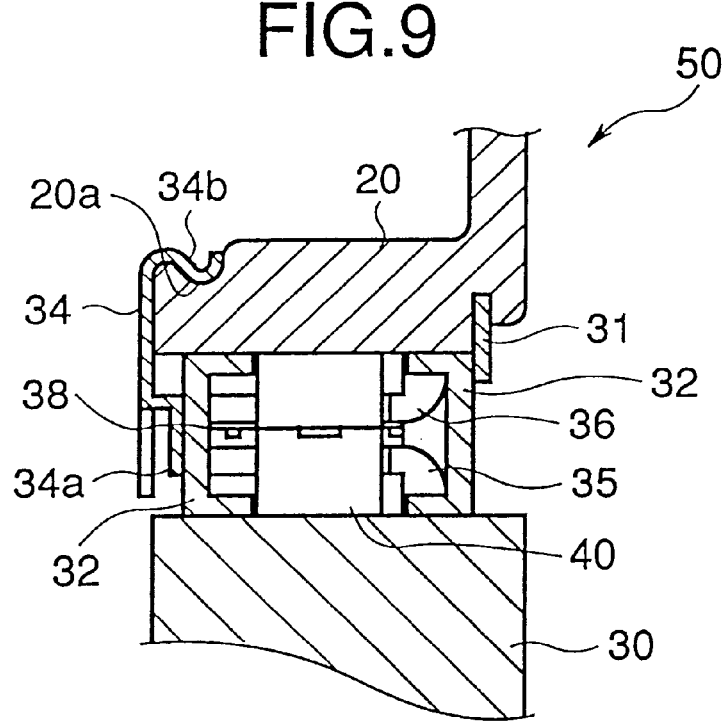
FIG. 9 is a view partly in axial cross-section showing a one-way clutch according to the second embodiment of the present invention.
Figure 10:
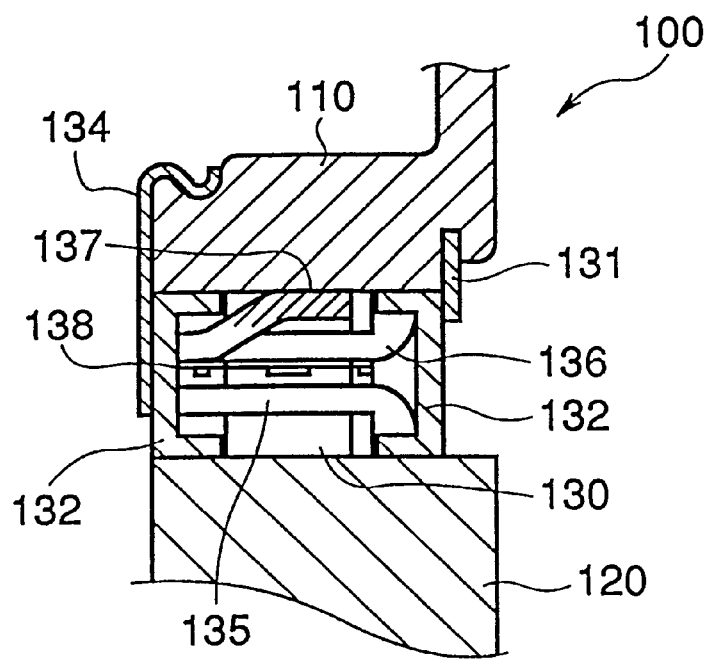
FIG. 10 is a view partly in axial cross-section showing a one-way clutch according to the prior art.

Reference is now had to FIG. 9 to describe a second embodiment in which the present invention is applied to a one-way clutch of the double cage type.

FIG. 9 is a view partly in axial cross-section showing a sprag type one-way clutch 50 (the double cage type) provided with sprags functioning as a cam. The one-way clutch 50 comprises an outer race 20, an inner race 30 disposed for rotation relative to the outer race 20, an annular inner holder 35 and an outer holder 36 disposed between the outer race 20 and the inner race 30, a plurality of sprags 40 circumferentially equidistantly held by the inner and outer holders 35 and 36, a spring member 38 for biasing the sprags 40 in a meshing direction, and end bearings 32 disposed at the axially opposite ends to prevent the inner and outer holders 35 and 36 from axially moving and also to maintain the concentricity of the outer race 20 and the inner race 30.

The end bearings 32 of the one-way clutch 50 are axially held by an annular snap sing 31 and annular retainers 34 fixed to the outer race 20 in order to be prevented from axially coming off. Also, the sprags 40 are given a rising moment in a direction meshing with the raceway surfaces of the inner and outer races by a ribbon spring 38.

As in the aforedescribed first embodiment, an arbitrary number of annular retainers 34 are provided circumferentially equidistantly on the radially outward edge portion, and are provided with flange portions 34b axially extending and having a waveform cross-section. The flange portions 34b are fixed to the radially outward edge portion 20a of the outer race having a waveform cross-section complementary to the flange portions 34b as by-caulking. As the result, the retainers 34 are held in a state fixed to the outer race 20.

The retainers 34 are provided with protruding portions 34a protruding toward the end bearings 32 at locations opposed to the end bearings 32. The protruding portions 34a protrude and extend axially from the bodies of the retainers 34 by a predetermined distance so as to contact with the axial end surfaces of the end bearings 32. Also, the backs of the end bearings 32 which do not frictionally contact with the protruding portions 34a bear against the axial end portions of the inner and outer holders 35 and 36. The protruding portions 34a frictionally contact with the end bearings 32, whereby predetermined drag torque is given to between the inner and outer holders 35 and 36 and the outer race 20 to thereby normally rotate the inner and outer holders 35 and 36 and the outer race 20 as a unit.

In the second embodiment wherein the present invention is applied to the one-way clutch having the double holder, the drag torque is transmitted between the outer race 20 and the inner and outer holders 35 and 36 through the protruding portions 34a of the retainers 34 fixed to the outer race 20 and the end bearings 32 frictionally contacting with the protruding portions 34a. As the result, the outer race 20 and the inner and outer holders 35 and 36 are rotated as a unit.

Again in the second embodiment, the protruding portions 34a of the retainers 34 can of course be formed as the various protruding portions shown in FIGS. 5A and 5B through 8A and 8B.

While in the above-described first and second embodiments, the retainers are fixed to the outer race side, the retainers may be of the type fixed to the inner race. In that case, drag torque is created between the inner race and the holder.

According to the sprag type one-way clutch of the present invention described above, there are obtained the following effects:

(1) Since a frictional force can be obtained between the outer race or the inner race and the holder through the retainers of the one-way clutch, the holder need not be subjected to special working and there is not the possibility of the strength of the holder being reduced. Also, since a drag clip or the like is not required as a discrete part, the number of parts is not increased.

(2) Particularly, in a one-way clutch (the single cage type) wherein only one holder is provided between the inner and outer races, when a side plate is not used, it has been difficult to give drag torque, but according to the present invention, it can be simply realized by the retainers.

What is claimed is:

1. A one-way clutch comprising an outer race having an inner peripheral raceway surface and an inner race disposed in said outer race and having an annular outer peripheral raceway surface, said outer race and said inner race being radially spaced apart from each other and disposed concentrically with each other for rotation relative to each other, a plurality of sprags disposed between said outer race and said inner race for transmitting torque between said outer peripheral raceway surface and said inner peripheral raceway surface, an annular holder for holding said sprags, a spring member for holding said sprags with said holder and biasing said sprags in a meshing direction, and an annular retainer fixed to one of said inner race and said outer race for axially holding said holder, characterized in that said retainer has a protruding portion protruding axially inwardly, and said protruding portion bears against the axial end portion of said holder so as to apply a predetermined drag torque thereto.

2. A one-way clutch according to claim 1, characterized by a single holder.

3. A one-way clutch according to claim 1, characterized by outer and inner double holders and an annular end bearing, said protruding portion of said retainer bearing against the axial end surface of said holder through said end bearing.

4. A one-way clutch comprising an outer race having an inner peripheral raceway surface and an inner race disposed in said outer race and having an annular outer peripheral raceway surface, said outer race and said inner race being radially spaced apart from each other and disposed concentrically with each other for rotation relative to each other, a plurality of sprags disposed between said outer race and said inner race for transmitting torque between said outer peripheral raceway surface and said inner peripheral raceway surface, an annular holder for holding said sprags, a spring member for holding said sprags with said holder and biasing said sprags in a meshing direction, and an annular retainer fixed to one of said inner race and said outer race for axially holding said holder, characterized in that said retainer has a protruding portion protruding axially inwardly, and said protruding portion applies a predetermined drag torque to an axial end portion of said holder.

5. A one-way clutch according to claim 4, characterized by a single holder.

6. A one-way clutch according to claim 4, characterized by outer and inner double holders and an annular end bearing, said protruding portion of said retainer bearing against the axial end surface of said holder through said end bearing.

* * * * *